US011108757B2

(12) United States Patent
Bryson (10) Patent No.: US 11,108,757 B2
(45) Date of Patent: Aug. 31, 2021

(54) SYSTEMS AND METHODS RELATING TO DIGITAL IDENTITIES

(71) Applicant: MASTERCARD INTERNATIONAL INCORPORATED, Purchase, NY (US)

(72) Inventor: Brandon Craig Bryson, Wildwood, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 134 days.

(21) Appl. No.: 15/850,155

(22) Filed: Dec. 21, 2017

(65) Prior Publication Data

US 2019/0199698 A1    Jun. 27, 2019

(51) Int. Cl.
*G06Q 20/38* (2012.01)
*G06Q 20/02* (2012.01)
*G06Q 20/40* (2012.01)
*H04L 29/06* (2006.01)
*G06F 16/951* (2019.01)

(52) U.S. Cl.
CPC ............ *H04L 63/08* (2013.01); *G06F 16/951* (2019.01); *G06Q 20/02* (2013.01); *G06Q 20/385* (2013.01); *G06Q 20/388* (2013.01); *G06Q 20/3821* (2013.01); *G06Q 20/4014* (2013.01); *H04L 63/0815* (2013.01)

(58) Field of Classification Search
CPC ... H04L 63/08; H04L 63/0815; G06F 16/951; G06Q 20/02; G06Q 20/3821; G06Q 20/385; G06Q 20/388; G06Q 20/4014; G06Q 20/38; G06Q 20/40

See application file for complete search history.

(56) References Cited

U.S. PATENT DOCUMENTS 8,266,432 B2 * 9/2012 Asghari-Kamrani ... G06F 21/31
                                                        713/168
9,413,533 B1 * 8/2016 Lindemann ........... H04L 9/3247
(Continued)

FOREIGN PATENT DOCUMENTS

CA         2934074 A1 *  6/2015  ........... G06Q 30/018

*Primary Examiner* — Shanto Abedin
*Assistant Examiner* — Howard H. Louie
(74) *Attorney, Agent, or Firm* — Harness, Dickey & Pierce, P.L.C.

(57) ABSTRACT

Systems and methods are provided for use in responding to attribute queries related to identifying information for a user. One exemplary method includes receiving a request for an identity code for a user associated with identifying information, where the identifying information includes multiple attributes of the user, and generating the identity code and transmitting it to a communication device associated with the user, thereby permitting the user to present the identity code to a requesting party. The method then includes receiving an identity request from the requesting party including the identity code and at least one query related to at least one of the multiple attributes of the user, identifying the user based on the identity code, compiling a response to the at least one query based on the identifying information of the user at one or more attributed providers, and transmitting the response back to the requesting party.

17 Claims, 3 Drawing Sheets

(56) References Cited

U.S. PATENT DOCUMENTS

| | | | |
|---|---|---|---|
| 2010/0318541 A1* | 12/2010 | Golwalkar | H04L 61/1517 |
| | | | 707/759 |
| 2011/0126010 A1* | 5/2011 | Kim | H04L 63/0853 |
| | | | 713/168 |
| 2011/0148576 A1* | 6/2011 | Gupta | G07C 9/27 |
| | | | 340/5.83 |
| 2012/0233705 A1* | 9/2012 | Boysen | G06F 21/335 |
| | | | 726/29 |
| 2012/0311663 A1 | 12/2012 | Seidl et al. | |
| 2013/0054569 A1* | 2/2013 | Mo | G06Q 30/02 |
| | | | 707/722 |
| 2013/0346314 A1* | 12/2013 | Mogollon | G06Q 20/385 |
| 2014/0223578 A1 | 8/2014 | Ross | |
| 2014/0279611 A1 | 9/2014 | Evans et al. | |
| 2014/0279992 A1* | 9/2014 | Morozov | G06F 16/215 |
| | | | 707/706 |
| 2015/0120559 A1 | 4/2015 | Fisher et al. | |
| 2016/0055322 A1 | 2/2016 | Thomas | |
| 2016/0071175 A1* | 3/2016 | Reuss | G06Q 30/0607 |
| | | | 705/26.25 |
| 2017/0250972 A1* | 8/2017 | Ronda | H04L 9/08 |
| 2017/0324750 A1 | 11/2017 | Khan | |

* cited by examiner

SYSTEMS AND METHODS RELATING TO DIGITAL IDENTITIES

FIELD

The present disclosure generally relates to systems and methods for managing user identities and, in particular, to systems and methods for use in providing responses to inquiries for certain users based on confirmation of digital identities related to the users.

BACKGROUND

This section provides background information related to the present disclosure which is not necessarily prior art.

People are generally associated with identities, which include names of the people, addresses, government identification numbers, etc. And, in connection with opening accounts, or otherwise interacting with businesses (e.g., applying for insurance, etc.), for example, people are often required to present proof of their identities. It is known for people to offer proof of their identities by providing government issued identifications, such as passports, drivers' licenses, etc., or by providing other similarly reliable documents (e.g., utility bills, etc.). The documents may often permit the requester of the documents to verify the people's identities and may provide other information about the people (e.g. birthdays, home addresses, etc.). Once the documents are presented, and the identities of the people are verified, the people are often able to continue in opening the accounts or otherwise interacting with the businesses. In connection with such continued processes, the businesses may further query the people about their qualifications for the accounts, such as, for example, income levels, prior transactions, etc. Then, based on the verified identities of the people and their subsequent responses relating to their qualifications for the accounts, the businesses may be able to move forward with new accounts for the people or otherwise interact with the people for one or more other business purposes.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Users often interact with businesses to apply for accounts such as, for example, banking accounts, investment accounts, insurance accounts, payment accounts, etc., or otherwise interact with the businesses, where the businesses, or other entities, in turn seek to verify identities of the users and/or attributes of the users. The businesses may, for example, solicit physical documents from the users, such as drivers' licenses or passports, to verify the identities of the users. In addition, the businesses may solicit other data, which may be verified by physical documents, or not, and which is usable by the businesses in interacting with the users. In turn, the users then provide the requested data to the businesses. That said, the physical documents may reveal additional information about the users, which is not needed and/or requested by the businesses or other entities. For example, a casino business may request an individual to verify his/her age (e.g., as being 21 years of age or older, etc.) by presenting a physical document including a birthday of the person (e.g., a driver's license, etc.). Often, however, such physical document will include a residential address, a driver's license number, a passport number, a travel history, etc. for the individual.

Uniquely, the systems and methods herein permit users to provision digital identities to an identity host, which is configured to then provide codes specific to the users, upon request, that are usable (e.g., by the businesses, etc.) to verify attributes of the users. Specifically, for a given user, the identity host captures and stores a digital identity for the user, which is associated with one or more attribute providers. When the user interacts with a business, or more generally, a requesting party, the user requests a code from the identity host, which is then provided to the business. The business then submits the code with a query back to the identity host. In turn, the identity host responds to the query either directly, or based on a response from the one or more attribute providers. The response is generally devoid of personal identifying information, or PII, for the user, or includes only limited PII. For example, the query from the business may include "Is this person 21 years of age and male?" to which the identity host may respond with an indicator associated with "yes" or "no." In this manner, the PII provided by the identity host is either limited or omitted, but with the response still providing the business the indicator of the data required to proceed. Thus, this feature of the systems and methods herein provides improved and/or enhanced security of PII over existing systems and methods were such information is actually disclosed to at least the requesting business.

Figure 1:
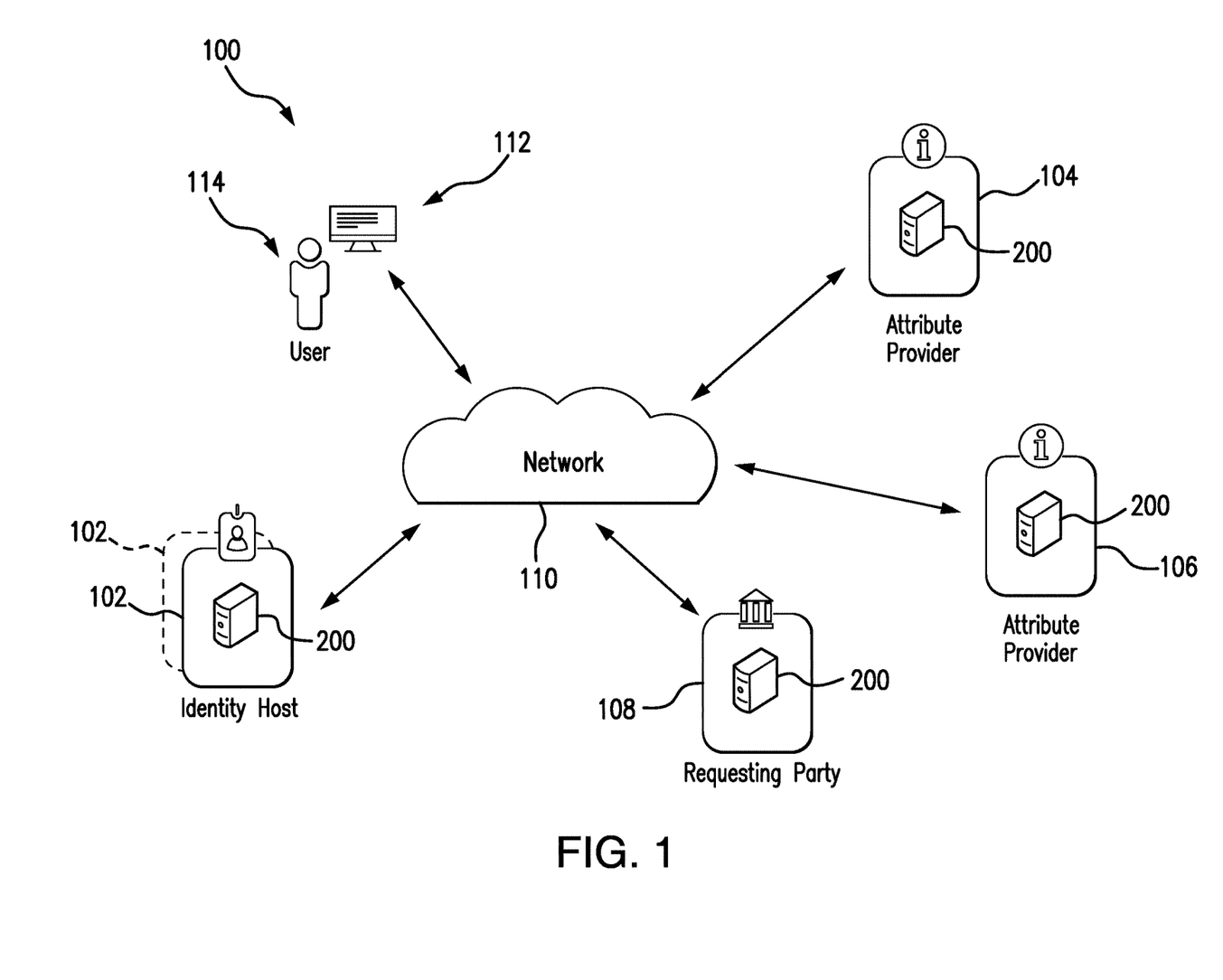
FIG. 1 illustrates an exemplary system of the present disclosure suitable for use in responding to inquiries related to a user based on a digital identity associated with the user.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, relationships between users and identity hosts, interactions between the identity hosts and attribute providers, etc.

The illustrated system 100 generally includes an identity host 102, attribute providers 104 and 106, and a requesting party 108, each of which is coupled to (and is in communication with) a network 110. The network 110 may include, without limitation, one or more of a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, the network 110 may include multiple different networks, such as a private network made accessible by the identity host 102 to the attribute provider 104 and, separately, the public Internet, which is accessible as desired to the identity host 102, the attribute provider 106, the requesting party 108, and a computing device 112 associated with a user 114, etc. It should be appreciated that he computing device 112 may include any suitable computing device within the scope of the present disclosure, including, for example, a workstation, a personal computer, a laptop, a tablet, a smartphone, another communication device (such as another laptop, tablet, smartphone), etc.

The identity host 102 of the system 100 may include any entity providing identity services to one or more requesting parties and/or users. In addition, the identity host 102 may be a standalone entity, as illustrated in FIG. 1, or it may be incorporated into and/or integrated with, in whole or in part, one or more other entities of the system. For example, in some exemplary embodiments, the identity host 102 may form part of a payment network (not shown), such as, for example, the MasterCard® payment network, etc. As described below, the identity host 102 may be configured to provide different roles (e.g., a rooted identity provider, an identity verifier, etc.). In connection therewith, while the identity host 102 is illustrated as a single entity in FIG. 1 (whether alone or as included in another entity of FIG. 1), it should be appreciated that the identity host 102 may be segregated into multiple different entities (as indicated by the dotted lines in FIG. 1), with each entity of the identity host 102 associated with one or more roles of the identity host 102 (e.g., with at least the rooted identity provider role being performed as an independent role by the identify host 102, etc.).

The attribute providers 104 and 106 of the system 100 include entities, generally separate from the identity host 102, which maintain data related to the user 114, etc. The attribute providers 104 and 106 may include any entity that captures and/or stores information about a person. Such data may include, without limitation, personal identifying information (PII) for the user 114 and may be specific to a type of the given one of the attribute provides 104 and 106 at issue. For example, the attribute provider 104 may include an insurance entity, which is the holder of an automobile policy in the name of the user 114. As such, the data related to the user 114, which is stored at the attribute provider 104, may include insurance coverages (e.g., insurance policy types, coverage limits, deductibles, etc.). And, the attribute provider 106 may include a financial institution, with which the user 114 has a payment account. The data related to the user 114, which is stored at the attribute provider 106, may then include transaction data for the user 114 (for the payment account) such as transaction frequencies, a number of transactions in a given term (e.g., ten transactions on average per week, etc.), an average balance, a current balance, automatic deposits, a number of authorized users for the payment account, etc. In yet other examples, the attribute provider 104 may include a telecommunication company (e.g., a mobile phone carrier, a cable carrier, a satellite television carrier, a network provider, etc.), a car company, a company associated with one or more mobile applications and/or websites, (e.g., related to fitness, restaurants, travel, entertainment, social networking, professional associations, or other subject matter, etc.), or other suitable companies, businesses, or entities.

While only two attribute providers 104 and 106 are shown in FIG. 1 for ease of reference, it should be appreciated that the system 100 may include multiple attribute providers within the scope of the of the present disclosure. For example, it should be appreciated that additional and/or different attribute providers (e.g., different from attribute providers 104 and 106, etc.) may be included in other system embodiments, which may include five, ten, fifteen, fifty, or even hundreds or thousands of attribute providers over one or more different users, where the attribute provides capture and/or store identifying information about the user(s). That said, in general, each attribute provider will generally include an entity having relationships with the user 114, such that some or all of the above data and/or additional or different data may be known to the given attribute provider. In view of the above, it should be appreciated that some attribute providers will include certain identifying information for the user 114, while other attribute providers will have the same and/or different identifying information. Thus, for example, the attribute provider 104 may have one portion of the total identifying information for the user 114 (e.g., transaction history, driver's license number, social security number, etc.), while the attribute provider 106 may have a different portion of the identifying information for the user 114 (e.g., insurance coverages, driver history, etc.).

The requesting party 108 of the system 100 includes an entity, such as, for example, a business, an individual, etc., which offers products and/or services for consumption by users (including the user 114). The requesting party 108 may be available to the user 114 as a physical location (e.g., a brick-and-mortal location, etc.) and/or a virtual location (e.g., a website, a network-based application, etc.), etc. As such, in connection with a purchase, rental, or other arrangement for a product and/or service between the requesting party 108 and the user 114, the requesting party 108 desires and/or may be obligated to verify the identity of the user 114 and/or certain attributes about the user 114. For example, the requesting party 108 may include a rental car business from which the user 114 attempts to rent a car, or the requesting party 108 may include a banking institution from which the user 114 requests a line of credit and/or a payment account, etc. In connection therewith, the requesting party 108 generally interacts with the user 114 (for a variety of reasons, as described) and seeks to "request" verification of the identity and/or attributes of the user 114. Specific interactions between the requesting party 108 and the identity host 102 and the user 114, as part of such request, are described in more detail below.

In addition in the illustrated system 100, the user 114 is associated with an identity, and with certain attributes that form the user's identity. Specifically, the identity of the user 114 may include, for example, a name of the user 114, a gender, a physical address, a phone number, an email address, a social security number, a passport number, a driver's license number, account numbers, etc. And, any or all of this information may be evidenced by one or more physical documents, such as, for example, a passport, a driver's license, a birth certificate, a utility bill, etc. Similarly, attributes of the user 114 may include, without limitation, an age of the user 114, a gender, a payment account transaction history (e.g., prior purchases, etc.), payment account balances, credit score(s), insurance coverage, travel history, immunization history, medical history (person or family), travel preferences (e.g., designation preferences, hotel preferences, airline preferences, airline seating preferences, etc.), driving record, location history, web search history, usage of one or more mobile applications and/or websites, relationship status, voter registration, property ownership, or other suitable attributes, etc.

While the illustrated system 100 includes only one identity host 102, two attribute providers 104 and 106 (as discussed above), and one requesting party 108, it should be appreciated that more or less of such entities (as also suggested above) and/or parts may be included in other system embodiments. Likewise, additional users and/or computing devices may be included in other system embodiments.

Figure 2:
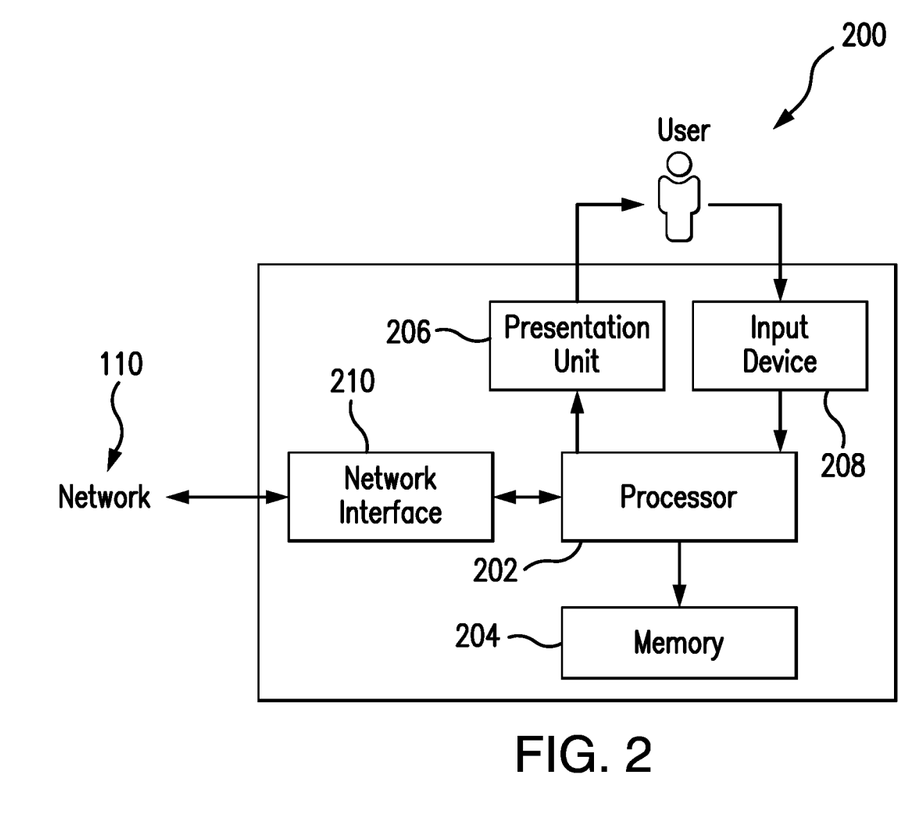
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, and as described above, the identity host 102, the attribute providers 104 and 106, and the requesting party 108 are each illustrated as including, or being implemented in, computing device 200, coupled to (and in communication with) the network 110. In addition, the computing device 112 associated with the user 114 can also be considered a computing device generally consistent with computing device 200 for purposes of the description herein. However, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, user identities, user attributes, transaction data, interfaces, images of documents, images of the user 114, biometrics associated with the user 114, other PII, and/or other types of data (and/or data structures) suitable for use as described herein. Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the functions or processes described herein.

In the exemplary embodiment, the computing device 200 also includes a presentation unit 206 that is coupled to (and that is in communication with) the processor 202 (however, it should be appreciated that the computing device 200 could include output devices other than the presentation unit 206, etc.). The presentation unit 206 outputs information (e.g., indicators of requested data, etc.), visually or audibly, for example, to a user of the computing device 200 (e.g., a user associated with the requesting party 108, etc.), etc. And, various interfaces (e.g., as defined by network-based applications, websites, etc.) (e.g., including instructions relating to user data and/or PII, etc.) may be displayed at computing device 200, and in particular at presentation unit 206, to display certain information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 may include multiple devices.

In addition, the computing device 200 includes an input device 208 that receives inputs from the user (i.e., user inputs) of the computing device 200 such as, for example, data relating to the user 114, etc., in response to appropriate prompts. The input device 208 may include a single input device or multiple input devices. The input device 208 is coupled to (and is in communication with) the processor 202 and may include, for example, one or more of a keyboard, a pointing device, a mouse, a stylus, a camera, a biometric reader (e.g., a fingerprint scanner, etc.), a touch sensitive panel (e.g., a touch pad or a touch screen, etc.), another computing device, and/or an audio input device. In various exemplary embodiments, a touch screen, such as that included in a tablet, a smartphone, or similar device, may behave as both the presentation unit 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a Bluetooth™ adapter, etc.), a mobile network adapter, or other device capable of communicating to one or more different networks herein (such as network 110) and/or with other devices described herein. Further, in some exemplary embodiments, the computing device 200 may include the processor 202 and one or more network interfaces incorporated into or with the processor 202.

Referring again to FIG. 1, in general in the system 100, the user 114 initially enrolls a digital identity to the identity host 102. In particular, the identity host 102 is configured to provide a network-based interface (e.g., a website, an application (e.g., a virtual wallet application, etc.), etc.) to the user 114 at the computing device 112, which solicits entry of personal identifying information (PII) for the user 114 and/or capture of physical documents related to the user's personal identifying information (PII). For example, the network-based interface may solicit entry of the name, mailing address, phone number, birth date, and social security number of the user 114, and may further be configured to capture or otherwise provide an image of the user's passport. What's more, in various embodiments the identity host 102 may rely on and/or utilize one or more entities, such as, for example, an identity verification service, to authenticate the personal identifying information and/or the physical document image(s) received from the user 114.

Optionally, in connection with such enrollment of the user 114, the identity host 102 may be configured to solicit information sufficient to authenticate the user 114. For example, the identity host 102 may be configured to solicit a facial image of the user 114 for comparison to an image included in one or more of the physical documents captured, etc. In connection therewith, the identity host 102 may be configured to also solicit other information about the user 114, either biometric or otherwise, where the information is known to the identity host 102 through one or more other entities (e.g., a payment network into which the identity host 102 is integrated, a related financial institution, etc.). In addition, rather than soliciting information known through one or more entities for use in authenticating the user 114, the identity host 102 may be configured to rely, in whole or in part, on authentication services from other entities, such as, for example, a user authentication service associated with a virtual wallet application associated with the user 114, etc.

Then, once the personal identifying information is received from the user 114 (via the network-based interface) and authentication of the user 114 is received and/or complete, the identity host 102 is configured to compile a digital identity for the user 114 and store the digital identity in memory (e.g., in the memory 204, etc.), thereby completing enrollment of the user 114 with the identity host 102.

Moreover, after enrollment of the user 114, the identity host 102 is configured to enroll the attribute providers 104 and 106. In doing so, the identity host 102 effectively links the user's identity kept at the identity host 102 with the user's identity kept at the attribute providers 104 and/or 106, as applicable. For example, the identity host 102 may be configured to link the user 114 to the identifying information at the attribute provider 104 by a mobile phone number, or government ID (e.g., a social security number, etc.), whereby, when requested by the identity host 102, the attribute provider 104 is configured to identify the user 114 to which the request is related (as describe below) via the link, for example.

Subsequently in the system 100, the user 114 may interact with the requesting party 108 for one or more reasons (as described above), where the requesting party 108 in turn requests verification of the user's identity and/or an attribute about the user 114. In response, herein, the user 114 accesses the identity host 102, via the network-based interface described above (as provided by the identity host 102) or via one or more other network-based interfaces, and solicits an identity code (generally based on his/her digital identity). Optionally, in connection with such request for the identity code (and as provided above), the computing device 112 and/or the network-based interface may be configured to authenticate the user 114, prior to permitting the requested interaction with the identity host 102 or as part of the interaction with the identity host 102. In this manner, only the user 114 is able to request an identity code associated with his/her digital identity, as stored at the identity host 102. After authentication, when utilized, the user's request is received at the identity host 102, and the identity host 102 is configured to generate the identity code, store the identity code in memory (e.g., in the memory 204, etc.), and associate the identity code with the digital identity of the user 114 (e.g., in the memory 204, etc.).

The identity host 102 then returns the identity code to the user 114, at the user's computing device (from which the request originated). The identity code may include an alpha-based code, a numeric code, an alpha-numeric code, or other code, which is generally a one-time code and usable for only a limited interval (e.g., one hour, five hours, one day, etc.).

In requesting the identity code, the user 114 may also designate the requesting party 108 as authorized and/or approved, via the network-based interface, to permit interaction between the identity host 102 and the requesting party 108, as desired and/or needed.

Upon receipt of the identity code from the identity host 102, the user 114 provides the identity code to the requesting party 108. In turn, the requesting party 108 is configured to compile and transmit a request to the identity host 102 for verification of the identity code (and, thus, the user 114). In general, the request will include at least one query, which is answerable by Yes/No (or True/False or 1/0) responses (e.g., "Does the user's social security number include 331?", or "Is the user 114 a male over the age of twenty-one?" (i.e., an age threshold query), or "Does the user 114 have more than $100,000 in liability insurance coverage?", or "Has the user spent more than $15,000 in the last three months on the payment account ending in 1234?", etc.). While generally in this form, the request may include other types of queries that request PII or parts of PII, but that can generally be answered without actually transmitting the PII or substantially transmitting the PII (to the point where the user 114 may be identified) (e.g., "What are the last four characters of the user's driver's license number?" or What is the name of the user's insurance company?" or "Is the user older than 25, have collision insurance over $30,000 that covers rental cars, and licensed to drive in the United States?" or "Has the user spent more than $10,000 across all credit cards in the past month and does the user have a credit score over 300?" or "Does the user live within 200 miles of ZIP code 12345 and has the user shopped online in the past six months?" etc.). With that said, regardless of whether the query is an actual Yes/No query, or not, the requesting party 108 may be provided with certain forms for queries to the identity host, such as, for example, "Is [name] over [years] of age?" or "Does [name] have insurance of [type of insurance] over [threshold amount]?" or "Does [name] end with/start with/include [value]?", etc., whereby certain variables and/or forms are used to identify content of the query to the identity host 102. What's more, the requesting party 108 may be encouraged to include certain keywords in the request to aid the identity host 102 in recognizing the query, such as age, insurance, social security number, ZIP code, miles, coverage, etc. Moreover, and even regardless of the form/type of the query included/submitted by the requesting party 108, the request will generally include the identity code received from the user 114 (so that the identity host 102 may verify the code).

In this exemplary embodiment, the request compiled by the requesting party 108 is transmitted to the identity host 102 via an OPAL™ query (see, http://www.opalproject.org/about-us/, which is incorporated herein by reference), or other suitable type of query, which may be provided as an application programming interface (API) or otherwise, and which attempts to act and/or acts to preserve the privacy of the data included in the request as would be understood by those skilled in the art. With that said, other mechanisms of querying the identity host 102, by the requesting party 108, for example, may be employed in other embodiments.

It should be appreciated, that when the request is submitted, the identity host 102 may be configured to transmit a confirmation request to the user 114, whereby the confirmation request may indicate the requesting party 108 and also the specific query by the requesting party 108. In doing so, the identity host 102 may further be configured to solicit a confirmation and/or acknowledgement to proceed, and/or even one or more inputs altering, expanding, or restricting the query to certain information to be provided. When the identity host 102 is configured in this way, the user 114 is provided with certain control over the requests for the user's identifying information thereby preventing queries from extending beyond what is relevant and/or necessary to the requesting party's purpose.

In turn in the system 100, upon receiving the request from the requesting party 108, the identity host 102 is configured to verify the identity code included in the request, thereby identifying the user 114, and to submit the request to the appropriate one(s) of the attribute providers 104 and 106, if any. The request, when submitted to the appropriate one(s) of the attribute providers 104 and 106, is submitted again via an OPAL™ query, or other suitable type of query, as described above. The identity host 102 is configured, in general, to identify the attribute providers 104 and 106 based on the enrollment above. In addition, the request generally includes certain identifying information for the user 114, which permits the appropriate one(s) of the attribute providers 104 and 106 the ability to identity the user 114, as referred to herein, via one or more links. Such links may include, for example, the name, the address, the mobile phone number, the social security number, driver's license number, and/or passport number of the user 114, etc. The attribute providers 104 and 106, in turn, are configured to identify the user 114 based on the one or more links The appropriate one(s) of the attribute providers 104 and 106 is/are configured to receive the request from the identity host 102, to identify the user 114 (based on the information in the request), to determine an attribute response to the query (e.g., including an answer to the query, etc.) based on identifying information held by the attribute provider 104 and/or 106, and to provide the attribute response back to the identity host 102.

Conversely, when the query associated with the request from the requesting party 108 is directed to information held by the identity host 102, for example, received in connection with enrollment of the user 114 or otherwise (e.g., a social security number of the user 114, an age of the user 114, etc.), the identity host 102 may be configured to omit transmitting the request to either of the attribute providers 104 and 106 and to compile and provide the response to the requesting party 108 directly.

In the illustrated system 100, regardless of whether a response to the request provided by the requesting party 108 is compiled at one of the attribute providers 104 and 106 or at the identity host 102, the response includes a limited amount of information about the user 114 (e.g., an insufficient amount of information to particularly identify the user 114 on its own, etc.). That is, a query regarding whether the user is greater than 25 years of age may simply return a response of "Yes" or "No", and not the actual age of the user 114. As such, when the response is compiled by one of the attribute providers 104 and 106, the identity host 102 will not, generally, in this embodiment, receive the personal identifying information upon which the response is based (e.g., the user's birth date, etc.). Likewise, the requesting party 108 will receive just a response to the query and not the data on which the response is based (e.g., and not any additional personal identifying information for the user 114, etc.).

What's more, the identity host 102 may be configured to impose restrictions on the number, type or permutation of queries from the requesting party 108. For example, the identity host 102 may restrict the requesting party 108 from submitting further queries related to age, based on prior identity request(s) related to age, whereby the user's age may be known (e.g., when a prior query of "is the user older than 26?" has already been submitted, then a later query of "is the user younger than 28?" may be restricted; etc.). That said, the requesting party 108 may be configured to permit multiple of the same requests, even when related to the same identifying information. That is, for example, a bar business may repeatedly submit identity requests about whether the user 114 is over 21 years of age (i.e., an age threshold), and answering that query multiple times does not further disclose the user's actual age. It should be appreciated that the identity host 102 may be configured to thus impose these and other restrictions on one or more queries, within a request or multiple requests, to protect unintended disclosures of identifying information.

Figure 3:
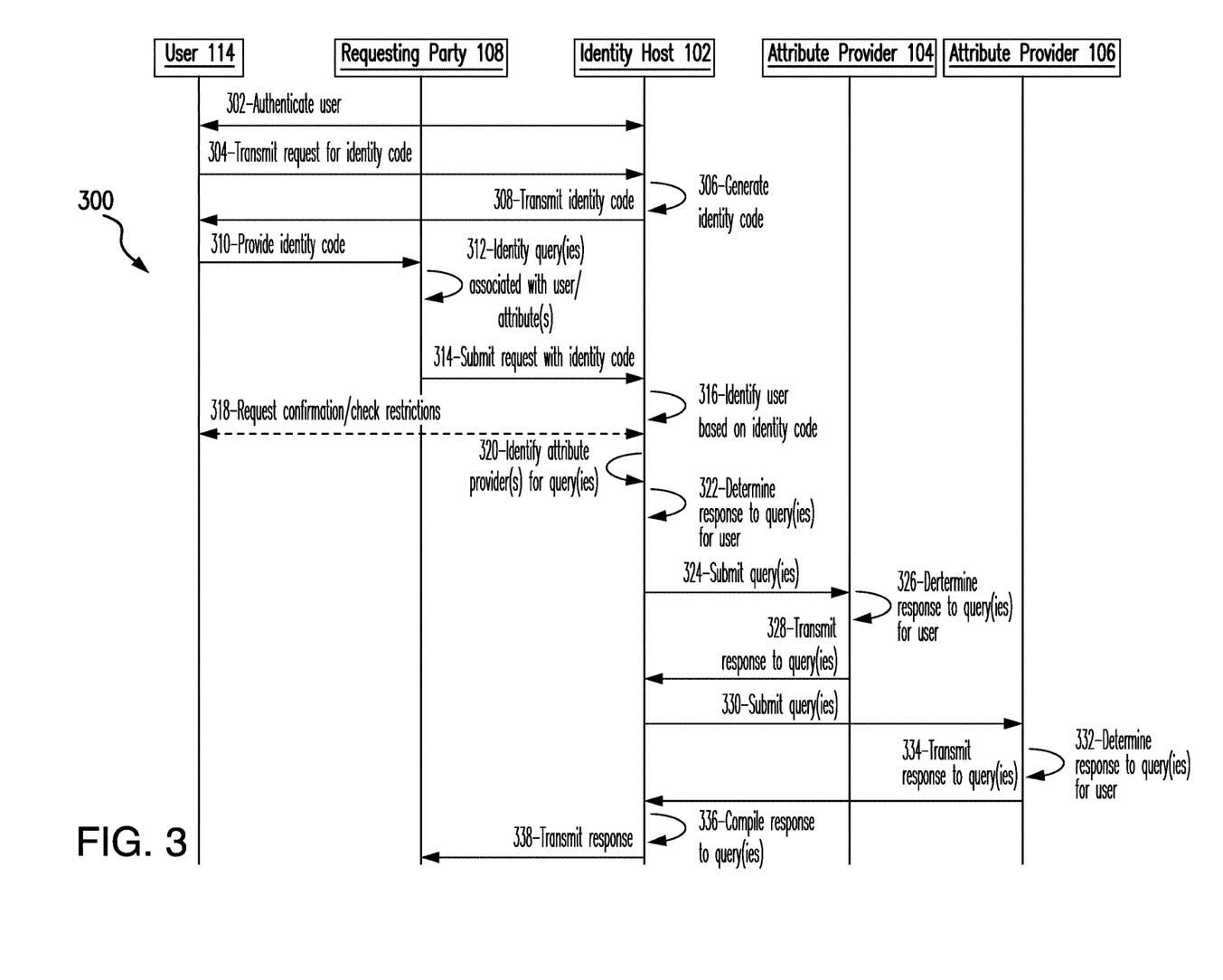
FIG. 3 is a flow diagram of an exemplary method, which may be implemented in connection with the system of FIG. 1, for responding to inquiries related to a user based on a digital identity associated with the user.

FIG. 3 illustrates an exemplary method 300 for use in responding to queries related to a user, based on a digital identity of the user. The exemplary method 300 is described (with reference to FIG. 1) as implemented in the identity host 102, the attribute providers 104 and 106, the requesting party 108, and the user 114 (and computing device 112) of the system 100. Reference is also made to the computing device 200 of FIG. 2. However, the methods herein should not be understood to be limited to the system 100 or the computing device 200, as the methods may be implemented in other systems and/or computing devices. Likewise, the systems and the computing devices herein should not be understood to be limited to the exemplary method 300.

In the method 300, after enrollment of the user 114 and the attribute providers 104 and 106 with the identity host 102, the user 114 interacts with the requesting party 108 for one or more purposes. For example, the user 114 may request a credit line from the requesting party 108, or request a car rental from the requesting party 108, or request a bonus travel offer from the requesting party 108 based on high spending, etc. In any case, upon interaction with the requesting party 108, or prior, the user 114 is initially authenticated, at 302, by the identity host 102, as generally described above in the system 100 (e.g., based on a biometric received from the user 114, based on a personal identification number (PIN) received from the user 114, based on interaction of the user 114 with the network-based interface associated with the identity host 102, etc.). By authenticating the user 114, it should be appreciated that certain fraudulent and/or unauthorized requests for identity codes from the identity host 102 may be limited and/or eliminated. What's more, while certain example interactions are provided herein between the user 114 and the requesting party 108 (whereby the requesting party 108 desires to verify an identity of the user 114), it should be appreciated that the method 300 is not limited to these examples and may be employed and/or adapted to other bases for interactions between the user 114 and the requesting party 108.

Next in the method 300, once the user 114 is authenticated, the user 114 transmits a request, at 304, via the computing device 112, for an identity code, to the identity host 102. The request includes an indication of the user 114 (e.g., based on the authentication of the user 114, based on a device ID or application ID associated with the user's computing device 112, based on an input by the user 114, etc.), and may further include a designation of the requesting party 108 thereby forecasting that the request is from/for the requesting party 108. In addition, the request may also include one or more limitations and/or descriptions of the personal identifying information that might be sought by the requesting party 108.

In turn, the identity host 102 receives the request from the user 114 and generates, at 306, the identity code, which may include, for example, a unique, one-time use identity code associated with the user 114. In doing so, the identity host 102 further stores the identity code in memory (e.g., the memory 204, etc.) in association with the user's digital identity (as generated for the user 114 upon registration of the user 114 with the identity host 102, etc.). The identity code may include any type of code, which may be alpha, numeric, alpha-numeric, symbol, machine readable symbol, or otherwise. One example of an identity code includes a barcode or a QR code, while another example identity code includes a globally unique identifier (GUID), or a universally unique identifier (UUID). Moreover, optionally, the identity code may be associated with the requesting party 108, such that the identity code includes an identifier for the requesting party 108 and/or is associated therewith in memory (e.g., the memory 204, etc.), whereby the requesting party 108, when submitting the identity code, may be verified as associated with the identity code, as indicated below. Thereafter, the identity host 102 transmits, at 308, the identity code back to the user 114, at the computing device 112.

The user 114, then, provides the identity code to the requesting party 108, at 310. The user 114 may provide the identity code to the requesting party 108 by merely reading the identity code to the requesting party 108. Additionally, or alternatively, the user's computing device 112 may display the identity code for viewing by the requesting party 108, or it may display a computer-readable symbol (e.g., a QR code, a barcode, etc.) at the presentation unit 206, of the computing device 112, for scanning or capture by the requesting party 108. In general, the manner in which the identity code is provided to the requesting party will be dependent, at least on part of the form, format and/or type of identity code provided to the requesting party 108.

In any case, the requesting party 108 receives and/or captures the identity code, and identifies, at 312, one or more queries that relate to the user 114 and/or attributes associated with the user 114 as may be relevant to its interaction of the user 114 with the requesting party 108 (e.g., based on the product and/or service requested by the user 114 from the requesting party 108, etc.). For example, where the requesting party 108 is a rental car business, the requesting party 108 may identify queries related to an age of the user 114 being over twenty-five, the user 114 having collision insurance coverage of $30,000 or more, and the user 114 having a valid driver's license in the United States. Similarly, when the requesting party 108 is a banking institution and the user 114 desires to open a new account, the requesting party 108 may identify queries related to the user's spend over the past six month, the user's spend over the last month, a number of transactions performed by the user 114 in a given interval, a credit score for the user 114 being above or below a threshold, etc. It should be appreciated that any number of different queries, depending on the type of interaction between the user 114 and the requesting party 108, may be identified as described herein. In at least one embodiment, the requesting party 108 merely identifies a subject matter for the request, the requesting party 108, and/or a designation or other indicator related thereto, and the identity host 102 then identifies the particular queries to which it will respond (rather than the requesting party 108 identifying the actual queries).

Once the desired queries are identified for the user's request (regardless if identified by the requesting party 108 or the identity host 102), the requesting party 108 submits, at 314, an identity request to the identity host 102. The identity request includes each of the identified queries (or an indicator by which the identity host 102 then identifies the appropriate queries) and the identity code received from the user 114. The request is submitted to the identity host 102, via the OPAL™ API query (and/or other suitable query). The identity host 102 receives the request and, optionally, verifies the identity code in memory (e.g., as being generated by the identity host 102 and/or associated with the user 114, etc.), and then once verified, identifies (and confirms) the user 114, at 316, based on the identity code (e.g., the identity host 102 compares the identity code received from the requesting party 108 to the identity code provided to the user 114 (at 308), etc.).

Further, and optionally, the identity host 102 may request confirmation from the user 114 and/or check restrictions on the queries included in the identity request, at 318. In particular, the identity host 102 may seek a confirmation and/or acknowledgement of the request, and/or the query of the request, from the user 114 for the specific request. The acknowledgement, when received from the user 114, may provide a general permission to proceed, or may include a restriction on the identifying information returned to the requesting party 108. Then, the identity host 102 imposes the restriction on the query. And also, the identity host 102 may impose restrictions to protect again unintended disclosures of identifying information through a series of questions. For example, an exemplary restriction may limit the age based queries to one or more queries, including in one or more prior identity requests, before restricting all other queries, to prevent or inhibit the requesting party from "zeroing in" on the age of the user 114, or some other attribute of the user 114, etc. By imposing the restrictions, the identity host 102 may alter the query, or simply return an error or failed query message to the requesting party 108.

Then, subject to the restrictions, if any, at 320, the identity host 102 identifies one or more of the attribute providers 104 and 106 for responding to the queries (i.e., the attribute provider(s) having a portion of identifying information suitable to answer the query(ies)). In general, the identity host 102 will employ rules associated with the queries, whereby the appropriate ones of the attribute providers 104 and 106 will be identified for the particular one or more of the queries, for example, through enrollment of the attribute providers 104 and/or 106 and/or assignment of rules to the identifying data captured and/or stored by the particular attribute providers. In particular, in the rental car example, the identity host 102 may identify the attribute provider 104, which is an insurance provider in this example, for queries related to insurance coverage, and may identify the attribute provider 106, which is a department of motor vehicles in the state of the user's residence in this example, for queries related to whether or not the user 114 has a valid driver's license, and may identify itself as an attribute provider for queries related to age of the user 114. It should be appreciated that the attribute providers 104 and 104 may be otherwise in other examples, but are specified here as an insurance provider and a department of motor vehicles for purposes of illustration only.

Then in the method 300, the identity host 102 determines, at 322, a response to the query(ies) for which it is the attribute provider. For instance, in the above car rental example, the identity host 102 (acting as an attribute provider) determines whether the user 114 is over twenty-five yes old. In particular, the identity host 102 determines that the user 114 is thirty-four years old based on the birth date of the user 114 included in the digital identity for the user 114 associated with the provided identity code, and thus determines the response to the query is "Yes." Optionally, the identity host 102, upon receiving the request from the requesting party 108, or later (but prior to transmitting a response), may determine and/or confirm that the requesting party 108 is associated with the identity code as included in the original request. In this manner, the requesting party 108 may be tied back to the request from the user 114 thereby providing further security and/or checking associated with the digital identity inquiry.

In addition, the identity host 102 submits, at 324, to the attribute provider 104, the query(ies) for which the attribute provider 104 is identified (e.g., the insurance coverage query in the above example, etc.). The query includes, or is accompanied by, at least some personal identifying information for the user 114, as provided from the user's digital identity associated with the identity code received from the requesting party 108. This identifying information provides one or more links, such as, for example, a the mobile phone number, the social security number, driver's license number, and/or passport number of the user 114, etc. The one or more links may be the same for each request to the attribute provider 104, or it may be different (e.g., for the different attribute providers 104 and/or 106, etc.). For example, a social security number, or mobile phone number, may be used in an initial request (or at enrollment of the attribute provider 104, for example) and then some other link, for example, a GUID, may be used as the one or more links for subsequent requests or for the other attribute provider 106. In this manner, certain identifying information may be removed and/or protected from the subsequent requests. In turn, the attribute provider 104 determines, at 326, an attribute response to the query(ies) received from the identity host 102 (e.g., a response to the insurance coverage query, etc.). In particular, the attribute provider 104 identifies the user 114 based on the personal identifying information provided in or with the query and then determines, based on identifying information, an answer to the query. In the above example, the attribute provider 104 determines whether the user 114 has the specific coverage required by the requesting party 108. Here, the attribute provider 104 determines the user 114 has $100,000 in liability coverage, and the response to the query is then "Yes." The attribute provider 104 then transmits an attribute response, including the "Yes" answer and/or the birthdate attribute (whereby the identity host 102 is able to then determine the answer to the query, etc.), back to the identity host 102, at 328, but not, in this example, the specific information related to the $100,000 liability coverage. That information is instead retained at the attribute provider 104.

Similarly, the identity host 102 submits, at 330, to the attribute provider 106, the query(ies) for which the attribute provider 106 is identified (e.g., the valid driver license query in the above example, etc.). The query includes, or is accompanied by, at least some personal identifying information for the user 114 as provided from the user's digital identity associated with the identity code received from the requesting party 108. The attribute provider 106 then determines, at 332, a response to the query(ies) received from the identity host 102 (e.g., a response to the insurance coverage query, etc.). In particular, the attribute provider 106 identifies the user 114 based on the personal identifying information provided in or with the query and then determines, in the above example, whether the user 114 has a valid driver's license in the state as required by the requesting party 108. Here, the attribute provider 106 determines the user 114 has held a valid driver's license for fifteen years and his/her current license expires in two months, and the response to the query is "Yes." The attribute provider 106 transmits the "Yes" response back to the identity host 102, at 334, but not, in this example, the specific duration for which the user's driver's license has been held or that it expires in two months. Again, that information is instead retained at the attribute provider 106.

It should be appreciated that any different number of queries may be included by the identity host 102 than described above and/or that a different number of attribute providers may be queried in other embodiments, depending on, for example, the queries submitted by the requesting parties and the data specific to the users in the possession of the particular attribute providers.

Finally in the method 300, once the identity host 102 receives responses to each of the queries, the identity host 102 compiles a response to the requesting party 108, at 336. The response may be representative of multiple responses, or it may be specific to each response, determined by the identity host 102 or received from the attribute providers 104 and 106, etc. Specifically, the identity host 102 may compile a single response of "Yes," thereby representing each of the "Yes" responses determined and/or received. Or, the identity host may compile a response of "Yes," "Yes," "Yes," where each discrete response is included for each of the three different queries. Regardless of form, after compiling the response, the identity host 102 transmits the response back to the requesting party 108, at 338, thereby informing the requesting party 108 about the user 114. As a result, the requesting party 108 is able to continue in its interactions with the user 114 (e.g., renting a car, etc.), or not.

In view of the above, the systems and methods herein permit requesting parties to submit queries relating to identifying users interacting with the requesting parties, where the queries are tied to identity codes specific to users (and corresponding digital identifies for the users). In response to the queries, an identity host is able to provide a response, determined by the identity host and/or an attribute provider separate therefrom, where the requesting party is informed about a user (e.g. about attributes of the user, etc.), while superfluous and/or unnecessary personal identifying information for the user is not provided to the requesting party (or potentially, the identity host), and often without relaying specific identifying information of the user (e.g., indicating that the user is over 21 years of age, but without disclosing the exact birthdate of the user, etc.). In this manner, the privacy of the user is maintained, while permitting the requesting party to receive information and/or confirmations needed for proceeding in interactions with the user (e.g., renting a car, opening an account, providing offers, etc.).

Again and as previously described, it should be appreciated that the functions described herein, in some embodiments, may be described in computer executable instructions stored on a computer readable media, and executable by at least one processor (in the same of different computing devices). The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving a request for an identity code for a user, the user associated with identifying information and the identifying information including multiple attributes of the user; (b) generating and transmitting the identity code for the user to the user at a computing device associated with the user, thereby permitting the user to present the identity code to a requesting party; (c) receiving an identity request from the requesting party including at least one query related to at least one of the multiple attributes of the user and including the identity code for the user; (d) identifying the user based on the identity code; (e) compiling a response to the at least one query of the identity request based on the identifying information of the user from at least one attributed provider; (f) transmitting the response to the requesting party, thereby permitting the requesting party to be informed about the identity of the user; (g) authenticating the user prior to receiving the request for the identity code for the user; (h) seeking, by the computing device, confirmation from the user, associated with the identity request, prior to compiling the response to the identity request; and (i) restricting the response to the requesting party based on at least one prior identity request from the requesting party when the identity request and the at least one prior identity request related to a same one of the multiple attributes of the user.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in responding to attribute queries related to identifying information for a user, based on a digital identity of the user, the method comprising:

receiving, by an identity host computing device, a request for an identity code for a user from a user computing device associated with the user, the user associated with identifying information and the identifying information including multiple attributes of the user;

in response to the request for the identity code, generating, by the identity host computing device, the identity code for the user and transmitting the identity code to the user computing device, thereby permitting the user to present the identity code to a requesting party, and wherein the identity code (i) includes an identification specific to the requesting party, (ii) is a one-time code and (iii) does not include identifying information of the user;

receiving, at the identity host computing device, an identity request from the requesting party including at least one query specific to at least one of the multiple attributes of the user and including the identity code for the user;

in response to the identity request:
identifying, by the identity host computing device, the user based on the identity code;
verifying, by the identity host computing device, that the identification of the requesting party is specific to the requesting party based on the identity code; and
compiling, by the identity host computing device, a response to the at least one query of the identity request, the response including an answer to the at least one query based on the at least one of the multiple attributes of the user included in the identifying information of the user from at least one attribute provider, wherein the response excludes the at least one of the multiple attributes of the user; and transmitting the response to the requesting party, thereby permitting the requesting party to be informed about the identity of the user based on the answer to the at least one query, without revealing the identifying information of the user to the requesting party.

2. The computer-implemented method of claim 1, further comprising authenticating the user prior to receiving the request for the identity code for the user.

3. The computer implement method of claim 1, further comprising seeking, by the identity host computing device, confirmation of the identity request from the user associated with the identity request, prior to compiling the response to the identity request.

4. The computer-implemented method of claim 1, further comprising:
   identifying, by the identity host computing device, the at least one attribute provider based on at least one attribute identified in the at least one query;
   submitting, by the identity host computing device, the at least one query to the identified at least one attribute provider; and
   receiving an attribute response from the at least one attribute provider to the at least one query; and
   wherein compiling the response to the at least one query of the request includes compiling the response based on the attribute response from the at least one attribute provider.

5. The computer-implemented method of claim 1, wherein the at least one query includes at least a first query and a second query and wherein the at least one attribute provider includes a first attribute provider and a second attribute provider; and
   wherein the method further comprises:
   submitting the first query to the first attribute provider;
   receiving a first attribute response from the first attribute provider, the first attribute response including a response to the first query;
   submitting the second query to the second attribute provider; and
   receiving a second attribute response from the second attribute provider, the second attribute response including a response to the second query; and
   wherein compiling the response to the at least one query of the identity request includes compiling the response based on the first attribute response and the second attribute response.

6. The computer-implemented method of claim 5, further comprising identifying, by the identity host computing device, the first attribute provider based on the first query, prior to submitting the first query to the first attribute provider.

7. The computer-implemented method of claim 1, further comprising storing a digital identity for the user in memory coupled to the identity host computing device; and
   wherein identifying the user based on the identity code includes identifying the user to the digital identity in the memory based on the identity code.

8. The computer-implemented method of claim 1, further comprising rejecting a query of a subsequent identity request when the query of the subsequent identity request is different than the at least one query of the identity request but is specific to a same one of the multiple attributes of the user included in the at least one query of the identity request.

9. A system for use in responding to attribute queries related to identifying information for a user, the system comprising:
   an identity host computing device configured to:
   receive a request for an identity code for a user, the user associated with identifying information including multiple attributes;
   in response to the request for the identity code, generate the identity code for the user and transmit the identity code to the user at a communication device associated with the user, wherein the identity code is a one-time code and does not include identifying information of the user;
   receive an identity request from a requesting party including the identity code and at least a first query specific to at least one of the multiple attributes of the user;
   in response to the identity request:
   submit the first query to a first attribute provider;
   receive an attribute response from the first attribute provider;
   compile a response to the identity request received from the requesting party, wherein the response to the identity request includes an answer to the first query, the answer indicative of the at least one of the multiple attributes and based on the attribute response from the first attribute provider, wherein the response to the identity request excludes the at least one of the multiple attributes of the user; and
   transmit, to the requesting party, the response to the identity request, thereby permitting the requesting party to be informed about an identity of the user by the answer to the first query, without revealing the identifying information of the user to the requesting party; and then in response to at least one subsequent identity request:
   reject a query of one of the at least one subsequent identity request when the query of the one of the at least one subsequent identity request is different than the first query of the identity request, but specific to a same one of the multiple attributes included in the first query of the identity request.

10. The system of claim 9, wherein the identity host computing device is further configured to authenticate the user prior to generating the identity code in response to the request for the identity code.

11. The system of claim 9, wherein the identity host computing device is further configured to identify the user based on the identity code and to identify the first attribute provider based on the user and at least one attribute indicated by the first query.

12. The system of claim 9, wherein the at least one of the multiple attributes of the user includes at least one of an age, a prior purchase, and an insurance coverage of the user.

13. The system of claim 9, wherein the first query includes a query directed to an age of the user relative to an age threshold.

14. The system of claim 9, wherein the identity host computing device is further configured to submit a second query, included in the identity request and specific to at least another one of the multiple attributes of the user, to a second attribute provider; and
   wherein the response to the identity request is further based on a second attribute response received from the second attribute provider in response to the second query.

15. A non-transitory computer readable storage medium including computer-executable instructions for responding to attribute queries related to identifying information for a user, which, when executed by at least one processor of an identity host computing device, cause the at least one processor to:

receive a request for an identity code for a user, from a mobile device of the user, the user associated with identifying information and the identifying information including multiple attributes of the user;

in response to the request for the identity code, generate the identity code for the user and transmit the identity code to the user at the mobile device of the user, thereby permitting the user to present the identity code to a requesting party, and wherein the identity code is a one-time code and does not include identifying information of the user;

receive an identity request from the requesting party, the identity request including the identity code and a first query related to identifying information associated with the user; and in response to the identity request:
submit the first query to a first attribute provider having at least a portion of the identifying information for the user, where the at least a portion of the identifying information is indicative of an answer to the first query; and compile, and transmit to the requesting party, a response to the identity request, the response including the answer to the first query based on an attribute response from the first attribute provider, wherein the response to the identity request excludes the portion of the identifying information indicative of the answer to the first query, thereby permitting the requesting party to be informed about the identity of the user by the answer to the first query, without revealing the identifying information of the user to the requesting party; and then in response to at least one subsequent identity request, reject a query of the at least one subsequent identity request based on an input from the user and/or when the query of the at least one subsequent identity request is different than the first query of the identity request but is related to a same portion of identifying information included in the first query of the identity request.

16. The non-transitory computer readable storage medium of claim 15, wherein the identity request includes a second query;

wherein the computer-executable instructions, when executed by the at least one processor, further cause the at least one processor to submit the second query to a second attribute provider having at least a second portion of the identifying information for the user, where the second portion of the identifying information is different from the portion of the identifying information at the first attribute provider and is indicative of an answer to the second query; and wherein the response to the identity request includes the answer to the second query, based on a second attribute response from the second attribute provider, and wherein the response to the identity request excludes the second portion of the identifying information indicative of the answer to the second query, thereby further permitting the requesting party to be informed about the identity of the user by the answer to the second query without revealing the identifying information of the user to the requesting party.

17. The computer-implemented method of claim 1, wherein the at least one of the multiple attributes is a government identification number, and wherein the answer to the at least one query includes only a portion of the government identification number.

\* \* \* \* \*